US012559897B2

(12) United States Patent
Zhuang et al.

(10) Patent No.: US 12,559,897 B2
(45) Date of Patent: Feb. 24, 2026

(54) INTELLIGENT CONSTRUCTION CONTROL METHOD AND SYSTEM FOR JET GROUTING PILE BASED ON STRATUM INFORMATION INVERSION

(71) Applicants: SHANDONG UNIVERSITY, Jinan (CN); SHANDONG JIANZHU UNIVERSITY, Jinan (CN)

(72) Inventors: Peizhi Zhuang, Jinan (CN); Kangxu Wang, Jinan (CN); He Yang, Jinan (CN); Jingjing Yin, Jinan (CN); Xiuguang Song, Jinan (CN); Chaoji Li, Jinan (CN); Chong Zhou, Jinan (CN); Yuanshun Qian, Jinan (CN); Chao Li, Jinan (CN); Mingpeng Liu, Jinan (CN)

(73) Assignees: SHANDONG UNIVERSITY (CN); SHANDONG JIANZHU UNIVERSITY (CN)

( * ) Notice: Subject to any disclaimer, the term of this patent is extended or adjusted under 35 U.S.C. 154(b) by 103 days.

(21) Appl. No.: 18/764,170

(22) Filed: Jul. 4, 2024

(65) Prior Publication Data

US 2025/0092627 A1 Mar. 20, 2025

(30) Foreign Application Priority Data

Sep. 15, 2023 (CN) .......................... 202311195815.5

(51) Int. Cl.
*E02D 15/04* (2006.01)
*E02D 5/36* (2006.01)
(Continued)

(52) U.S. Cl.
CPC .............. *E02D 5/36* (2013.01); *E02D 15/04* (2013.01); *E21B 44/00* (2013.01); *G06N 3/08* (2013.01);
(Continued)

(58) Field of Classification Search
CPC .. E02D 5/36; E02D 5/22; E02D 15/04; E02D 2250/0023; E02D 2300/0018; E21B 44/00
See application file for complete search history.

(56) References Cited

U.S. PATENT DOCUMENTS 10,119,240 B2 * 11/2018 Zhang ..................... E02D 33/00
2015/0081222 A1 * 3/2015 Laing ..................... G06N 20/00
702/9

(Continued)

FOREIGN PATENT DOCUMENTS

CN 115148299 B * 9/2024 ............. G06N 20/00
CN 113722981 B * 11/2024 ............. G06N 20/00

OTHER PUBLICATIONS

Machine Translation CN-115148299; 2024 (Year: 2024).*
Machine Translation CN-113722981; 2024 (Year: 2024).*

*Primary Examiner* — Benjamin F Fiorello

(57) ABSTRACT

The present invention relates to pile foundations and provides an intelligent construction control method and system for jet grouting piles based on stratum information inversion. This method integrates multi-source sensing components and local transmission to perceive real-time drilling information to a data integration terminal. Using engineering soil layer data as training samples, a machine learning algorithm correlates perception information with geological conditions, judging and outputting stratum conditions in real time. An XGBoost model quickly and accurately identifies soil layers at the site. Based on big data matching of a cloud platform, an optimal construction parameter database is established, and the optimal combination of parameters is acquired through algorithm matching. A variable-frequency and variable-speed pressure adjusting device links a piling machine intelligent control system with other subsystems to achieve intelligent control, reducing material consumption and improving pile quality and efficiency.

10 Claims, 5 Drawing Sheets

(51) Int. Cl.
    E21B 44/00       (2006.01)
    G06N 3/08       (2023.01)

(52) U.S. Cl.
    CPC ................ *E02D 2250/0023* (2013.01); *E02D 2300/0018* (2013.01)

(56)         References Cited

U.S. PATENT DOCUMENTS

| | | | |
|---|---|---|---|
| 2021/0018655 A1 * | 1/2021 | Sun | E21B 43/00 |
| 2021/0148214 A1 * | 5/2021 | Zagre | E21B 44/02 |
| 2023/0058683 A1 * | 2/2023 | Braz | G06Q 10/06 |

\* cited by examiner

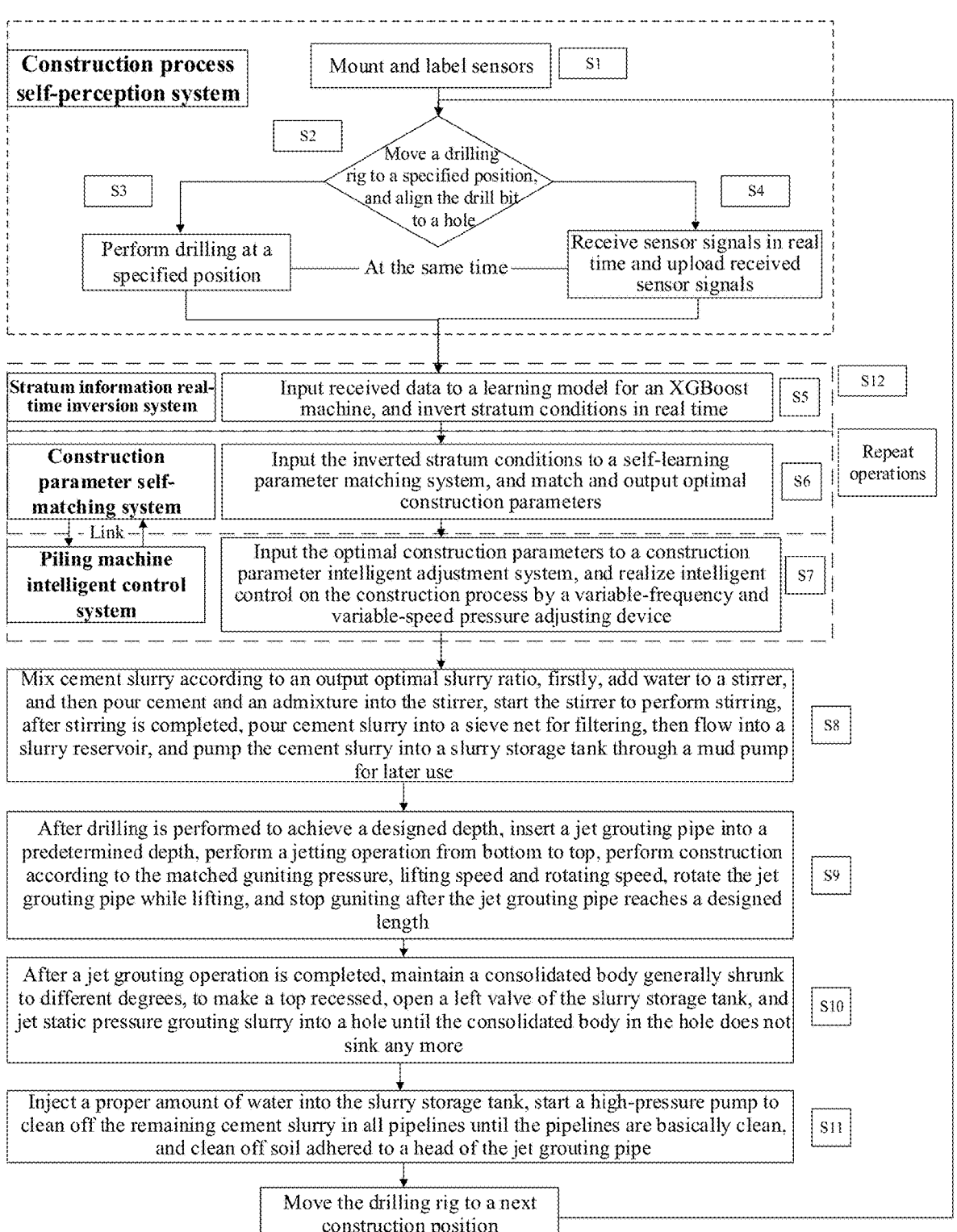

Construction process self-perception system

Mount and label sensors — S1

S2 — Move a drilling rig to a specified position, and align the drill bit to a hole S3 — Perform drilling at a specified position At the same time S4 — Receive sensor signals in real time and upload received sensor signals

Stratum information real-time inversion system

Input received data to a learning model for an XGBoost machine, and invert stratum conditions in real time — S5

S12

Repeat operations

Construction parameter self-matching system

Input the inverted stratum conditions to a self-learning parameter matching system, and match and output optimal construction parameters — S6

— Link —

Piling machine intelligent control system

Input the optimal construction parameters to a construction parameter intelligent adjustment system, and realize intelligent control on the construction process by a variable-frequency and variable-speed pressure adjusting device — S7

Mix cement slurry according to an output optimal slurry ratio, firstly, add water to a stirrer, and then pour cement and an admixture into the stirrer, start the stirrer to perform stirring, after stirring is completed, pour cement slurry into a sieve net for filtering, then flow into a slurry reservoir, and pump the cement slurry into a slurry storage tank through a mud pump for later use — S8

After drilling is performed to achieve a designed depth, insert a jet grouting pipe into a predetermined depth, perform a jetting operation from bottom to top, perform construction according to the matched guniting pressure, lifting speed and rotating speed, rotate the jet grouting pipe while lifting, and stop guniting after the jet grouting pipe reaches a designed length — S9

After a jet grouting operation is completed, maintain a consolidated body generally shrunk to different degrees, to make a top recessed, open a left valve of the slurry storage tank, and jet static pressure grouting slurry into a hole until the consolidated body in the hole does not sink any more — S10

Inject a proper amount of water into the slurry storage tank, start a high-pressure pump to clean off the remaining cement slurry in all pipelines until the pipelines are basically clean, and clean off soil adhered to a head of the jet grouting pipe — S11

Move the drilling rig to a next construction position

INTELLIGENT CONSTRUCTION CONTROL METHOD AND SYSTEM FOR JET GROUTING PILE BASED ON STRATUM INFORMATION INVERSION

TECHNICAL FIELD

The present invention belongs to the technical field of pile foundations, and particularly relates to an intelligent construction control method and system for jet grouting piles based on stratum information inversion.

BACKGROUND ART

The statements in this section merely provide information of background art related to the present invention and do not necessarily constitute the prior art.

A jet grouting pile has been widely used in foundation reinforcement and waterproof curtains. It refers to that a grouting pipe with a nozzle is driven to a predetermined position of a soil layer or is placed in the predetermined position after drilling with a drilling rig; slurry/water is ejected out from the nozzle with high pressure. While the grouting pipe rotates, it is jetted to make soil and the slurry mixed to form a cement-soil pile body. The diameter and quality of the jet grouting pile are closely related to soil quality, construction conditions, etc. The construction conditions include the drilling diameter, jetting method, nozzle diameter, jetting pressure, slurry density, lifting speed of the grouting pipe, etc. Mismatch between the construction and soil conditions (such as improper match in guniting pressure, pipe drawing speed, rotating speed and grouting amount) is prone to causing serious problems of uneven strength of the pile body, necking, material waste, low construction efficiency, etc. Therefore, it is necessary to dynamically control the pile quality and the construction efficiency based on the soil quality. In practical engineering, a field test is usually performed to determine construction parameters by selecting a section with similar conditions to the construction site. However, the derived construction process parameters may not be suitable to the actual soil layer due to complex stratum conditions. This will result in low construction efficiency, poor quality and broken piles during the construction of jet grouting piles.

At present, a commonly used machine for jet grouting piles includes a high-pressure pump, a slurry stirrer, a drilling rig with a drill rod, and a power head apparatus for driving the drill rod to rotate. For the prior art, soil layer distribution is normally determined by monitoring the current value of a power head of the drilling rig. However, the current value is not only related to the soil layer type, but also affected by factors such as penetration pressure, speed and depth. Therefore, it is not accurate to determine the soil layer distribution and control construction process parameters directly by the current value.

SUMMARY OF THE INVENTION

In order to solve at least one technical problem in the above background art, the present invention provides an intelligent construction control method and system for a jet grouting pile based on stratum information inversion. The method and the system take the drilling depth, output power of a drilling rig, axial force of a drill rod, and torque and pore water pressure of a drill bit as initial data. During pile construction, it will help invert stratum information in real time, match optimal construction parameters, and intelligently control a construction process, thereby reducing the cost of material consumption and improving pile quality and efficiency.

In order to achieve the above purpose, the present invention adopts the following technical solutions.

Firstly, an intelligent construction control method for a jet grouting pile is provided based on stratum information inversion, including the following steps:

acquiring construction data in a drilling process;

performing inversion in combination with the construction data in the drilling process and an XGBoost machine learning model (an artificial intelligence learning model) to obtain stratum inversion data;

obtaining optimal construction parameters by matching the optimal construction parameter database (already available from the stratum inversion data) and a self-learning parameter matching model; and linking the construction parameter intelligent adjustment module with the self-learning parameter matching model. When the stratum inversion data changes during this process, the self-learning parameter matching model is updated in real time to obtain an updated optimal construction parameter combination, and the construction parameter intelligent adjustment module automatically adjusts construction parameters by controlling a variable-frequency and variable-speed pressure adjusting device. Therefore, a whole construction process of the jet grouting pile is performed according to the updated optimal construction parameters.

Secondly, an intelligent construction control system for a jet grouting pile is provided based on stratum information inversion, including:

a construction process self-perception module, used for acquiring construction data in a drilling process;

a stratum information real-time inversion module, used for performing inversion in combination with the construction data in the drilling process and the XGBoost machine learning model to obtain stratum inversion data;

a construction parameter self-matching module, used for obtaining an optimal construction parameter by matching the optimal construction parameter database and a self-learning parameter matching model; and a pile foundation intelligent control module, used for linking a construction parameter intelligent adjustment module with the self-learning parameter matching model. The self-learning parameter matching model is updated in real time to obtain an updated optimal construction parameter combination, and the construction parameter intelligent adjustment module automatically adjusts construction parameters by controlling a variable-frequency and variable-speed pressure adjusting device according to the updated optimal construction parameter combination. Hence, the whole construction process of the jet grouting pile is performed according to the optimal construction parameters.

Thirdly, a computer-readable storage medium is provided. The computer-readable storage medium stores a computer program. When the program is executed by a processor, the abovementioned intelligent construction control method in a first aspect are implemented.

Fourthly, a computer device is provided. The computer device includes a memory, a processor and a computer program stored in the memory and running on the processor. When the processor executes the program, the abovementioned intelligent construction control method in the first aspect are implemented.

Compared with the prior art, the present invention has the beneficial effects:

1. the present invention intelligently controls a construction process by linking the variable-frequency and variable-speed pressure adjusting device with a construction parameter self-matching system, so that whole-process construction of the jet grouting pile can be performed according to the optimal construction parameters.

2. By integration and local transmission of multi-source sensing components, the present invention monitors the drilling depth and the output power of the drilling rig in real time, perceives the torque, the axial force and the pore water pressure in the drilling process, and accurately monitors key parameters in the drilling process.

3. Based on a machine learning algorithm, the present invention establishes a correspondence relationship between perception information and geological conditions. It will enable the stratum conditions to be judged and output in real time, thereby improving accuracy of inverting stratum distribution during construction of the jet grouting pile.

4. Based on big data matching of a cloud platform, the present invention establishes an optimal construction parameter database capable of being continuously updated and growing. It can acquire an optimal combination of the construction parameters through algorithm matching, thereby effectively reducing material consumption and improving the pile quality and efficiency.

The advantages of the additional aspects of the present invention will be partially provided in the following description, some of which will become apparent from the following description, or will be understood through the practice of the present invention.

BRIEF DESCRIPTION OF DRAWINGS

The accompanying drawings as a part of the present invention are included to provide a further understanding of the present invention. Exemplary embodiments of the present invention and description thereof are adopted to illustrate the present invention, and not intended to form improper limits to the present invention.

FIG. 1 is a flowchart of steps of an intelligent construction method for a jet grouting pile based on stratum information real-time inversion provided by an embodiment of the present invention;

Figure 2:
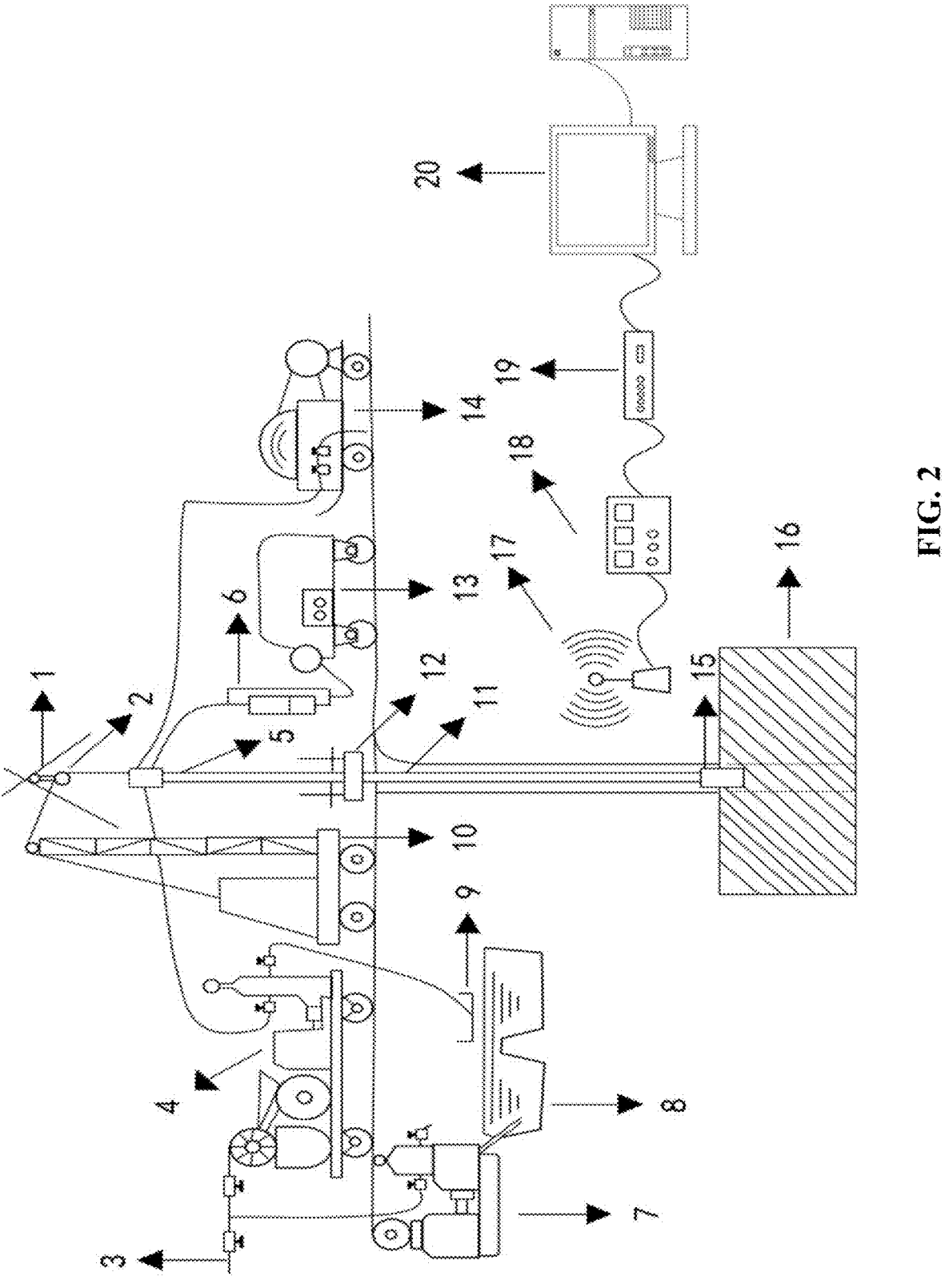
FIG. 2 is a schematic working diagram of an intelligent construction control system for a jet grouting pile based on stratum information real-time inversion provided by an embodiment of the present invention.
Figure 3:
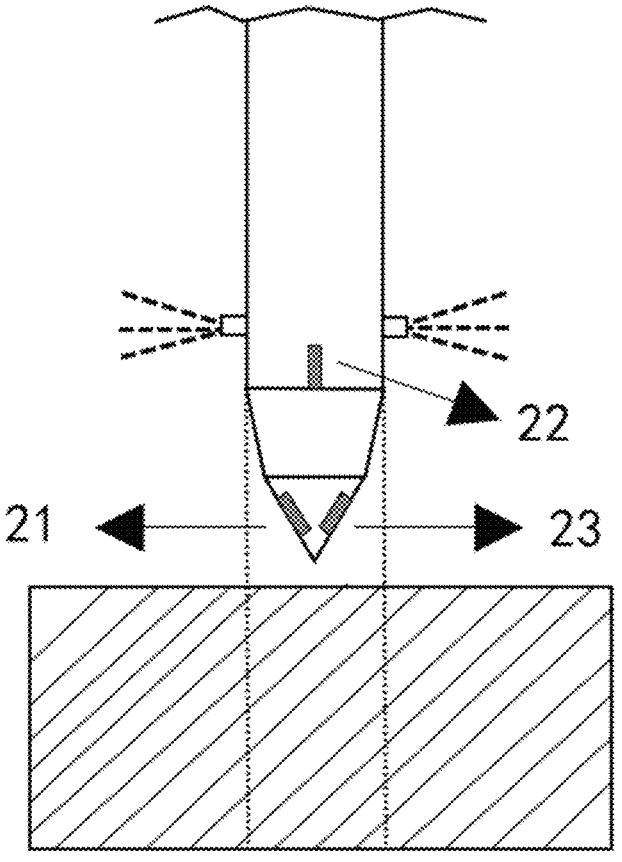
FIG. 3 is a layout diagram of sensors provided by an embodiment of the present invention.

In the figures, 1—triangular bracket; 2—hoister; 3—grouting pipe; 4—stirrer; 5—jet grouting pipe; 6—rotameter, 7—slurry storage tank; 8—slurry reservoir; 8—drill rod; 9—sieve net; 10—high-pressure jet-grouting drilling rig; 11—drill rod; 12—porthole apparatus; 13—air compressor; 14—high voltage variable frequency pump; 15—drill bit; 16—grouting layer; 17—wireless signal; 18—line concentrator; 19—single-chip microcomputer; 20—data integration terminal; 21—torque sensor; 22—pore water pressure sensor; 23—axial force sensor.

DETAILED DESCRIPTION OF THE EMBODIMENTS

The following will provide further explanation of the present invention in conjunction with the accompanying drawings and embodiments.

It should be pointed out that the following detailed explanations are exemplary and aim to provide further explanation of the present invention. Unless specified otherwise, all technical and scientific terms used herein have the same meanings as those commonly understood by ordinary skilled in the prior art to which the present invention belongs.

It should be noted that the terms used herein are only for describing embodiments and are not intended to limit exemplary embodiments according to the present invention. As used here, unless otherwise explicitly stated in the context, the singular form is also intended to include the plural form. In addition, it should be understood that when the terms "comprising" and/or "including" are used in this specification, they indicate the existence of features, steps, operations, devices, components, and/or their combinations.

Embodiment I

The embodiment provides an intelligent construction control method for a jet grouting pile based on stratum information inversion, including the following steps:

S1, a torque sensor 21 and a pore water pressure sensor 22 are mounted on a drill bit; an axial force sensor 23 is mounted at a lower part of a drill rod; and the sensors are labeled;

S2, a high-pressure jet-grouting drilling rig 10 is moved to a specified position; the drill bit 15 is aligned to a center of a hole; and the drilling rig 10 is leveled and placed smoothly and horizontally;

S3, drilling is performed in the specified position; drilling depth and output power of the drilling rig are monitored in real time by using the high-pressure jet-grouting drilling rig 10; and torque, pore water pressure and axial force in the drilling process are perceived in real time by using the torque sensor 21, the pore water pressure sensor 22, and the axial force sensor 23;

S4, a wireless sensor network system receives wireless signals 17 of the sensors and uploads data to a data integration terminal 20;

S5, received data is used as an input layer of an XGBoost machine learning model, and an output layer is the soil layer type, strength, water content and permeability coefficient;

S6, the output soil layer type, strength, water content and permeability coefficient are input into a self-learning parameter matching module in the data integration terminal 20, and an optimal construction parameter combination is matched based on an optimal construction parameter database;

S7, the matched optimal construction parameter combination is input into a construction parameter intelligent adjustment module in the data integration terminal 20, and construction parameters are automatically adjusted by a variable-frequency and variable-speed pressure adjusting device (including a drilling driving motor and a high voltage variable frequency pump) to achieve intelligent control of a construction process;

S8, cement slurry is mixed according to an output optimal slurry ratio; firstly, water is added to a stirrer 4, and then cement and an admixture are poured into the stirrer; the stirrer starts to perform stirring; after stirring is completed, a right valve of the stirrer is unscrewed, and cement slurry is poured into a sieve net 9 to be filtered, then flows into a slurry reservoir, and then is pumped into a slurry storage tank 7 through a mud pump for later use;

S9, after drilling is performed to achieve a designed depth, a jet grouting pipe 5 is mounted; after being inserted into a predetermined depth, the jet grouting pipe 5 performs a jetting operation from bottom to top, construction is performed according to matched guniting pressure, lifting speed and rotating speed; the jet grouting pipe is rotated while being lifted, and guniting is stopped after the jet grouting pipe reaches a designed length;

S10, after a jet grouting operation is completed, a consolidated body generally shrinks to different degrees due to the bleeding effect of slurry; to eliminate the top recessed, it is necessary to replenish the slurry in time, and the left valve of the slurry storage tank is opened, and static pressure grouting slurry is jetted into a hole through the grouting pipe 3 until the consolidated body in the hole does not sink any more;

S11, a proper amount of water is injected into the slurry storage tank 7, the high-pressure pump 14 starts to clean off the remaining cement slurry in all pipelines until the pipelines are basically clean, and soil adhered to a head of the jet grouting pipe is cleaned off; and S12, the drilling rig 10 is moved to a next construction position, and the above steps are repeated to complete construction of the jet grouting pile.

In step S3, when the drill bit drills holes in different types of soil layers at different depths, there are different torque and pore water pressure at the drill bit, different axial force of the drill rod and different output power of the drilling rig. Multi-source sensing components are used to perceive the above parameters in real time as a basis for judging the types of the soil layers.

In step S4, the wireless signals of the sensors are emitted underground and are affected by real-time downward drilling of the drill bit. In order to ensure stability and accuracy of signal transmission, a line concentrator is arranged between the wireless signals and the receiving terminal, and received signals are regenerated, shaped and amplified to expand a transmission distance of the signals and maintain stability of the signals.

Figure 4:
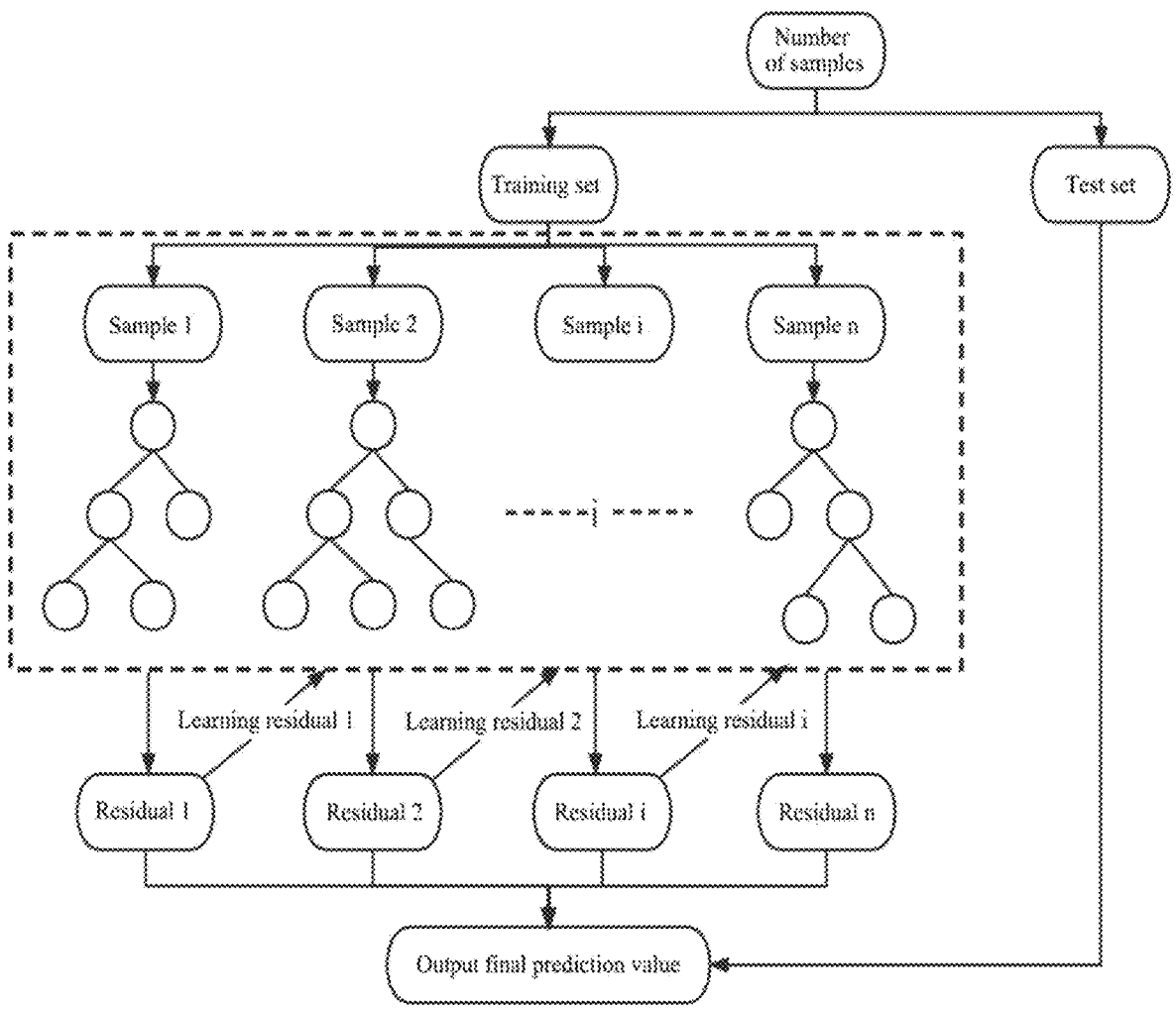
FIG. 4 is a flowchart of an algorithm of an XGBoost model provided by an embodiment of the present invention.

In step S5, the XGBoost model that takes both speed and efficiency into consideration is capable of enhancing gradient boosting performance. By using a parallel tree boosting method, learning speed of the model is increased, and the model can be run on different platforms and in different language environments, thereby strengthening nonlinear learning ability and scalability. Therefore, the XGBoost model has significant advantages of high efficiency and portability in prediction problems and practical application. A flowchart of an algorithm of the XGBoost model is shown in FIG. 4. A specific construction process is as follows:

in the present invention, by using a large engineering soil layer property database as a training sample, and the drilling depth, the torque, the axial force, the pore water pressure and the output power as the input layer of the model, a correspondence relationship between perception information and stratum conditions is established; and by using the soil layer type, strength, water content and permeability coefficient as the output layer, a stratum is predicted, and stratum information is inverted in real time.

An XGBoost machine learning model continuously optimizes various parameters of the model by learning the training sample, thereby improving the efficiency and the accuracy of identifying the types of the soil layers at different depths. The identified types of the soil layers are basic soil layer types, such as sandy soil, silty soil, and clay.

In step S6, an artificial neural network used by a self-learning parameter matching system expresses a construction parameter matching model as a multi-input and multi-output mapping relationship:

$$f:Y = f(x)$$

where x is an input vector, $x=(\alpha_1, \alpha_2, \alpha_3, \ldots \alpha_n)$, and $\alpha_1 - \alpha_n$ represents a construction parameter component; and Y is an output vector, $Y=(\beta_1, \beta_2, \beta_3, \ldots \beta_n)$, and $\beta_1 - \beta_n$ represents the output performance components.

The construction parameter matching model is constructed by a large number of processing units connected to each other in a certain way, and basic cells are called neurones. Each neuron in the neural network receives input signals of other neurones connected to the neuron, and each input signal corresponds to a weight. A weighted sum of all the received signals determines an activation state of the neuron. These neurones have local memories, and can perform local operations. Each neuron has a single output connection which is capable of being branched into a plurality of parallel connections as needed to output a same signal, and the signal is not affected by the number of the parallel connections.

Figure 5:
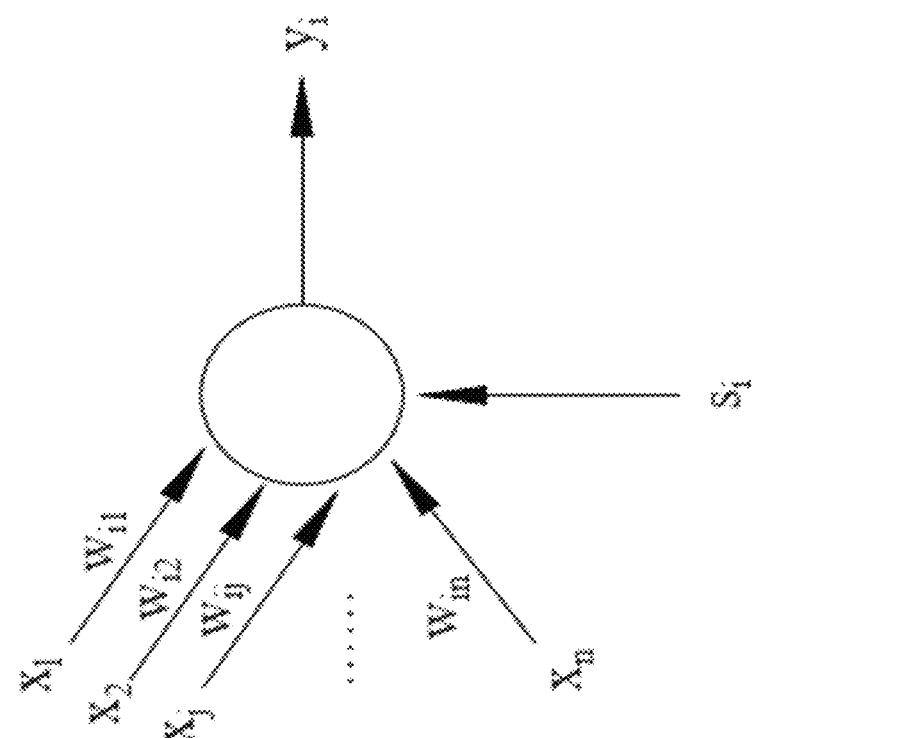
FIG. 5 is a model diagram of a single neuron structure provided by an embodiment of the present invention.

As shown in FIG. 5, a single neuron structure is capable of being divided into input signals, an input signal weight, an external input signal, an activation function and an output signal, where $x_1, x_2 \ldots x_j \ldots x_n$ represent the input signals; $w_{ij}$ represents the input signal weight; $s_i$ represents the external input signal; $f(\cdot)$ represents the activation function; and $y_i$ represents the output signal. The above model can be expressed as:

$$y_i = f\left(\sum_{j=1}^{n} w_{ij}x_j + s_i\right)$$

a construction process of the self-learning parameter matching model includes: implicitly expressing a mapping relationship by using the artificial neural network; with data of the construction parameters and pile quality as samples, inputting the data into a constructed neural network for training; finding a nonlinear mapping relationship between the construction parameters of the jet grouting pile and the pile quality; storing the nonlinear mapping relationship in a connection weight of input and output neurones; and with the construction parameters of the jet grouting pile as input variables and the pile quality as an output variable, acquiring an optimal combination of the construction parameters by algorithm matching.

Further, due to a complex influence of various construction parameters on the pile quality, it is difficult to express it by a clear mathematical expression.

Therefore, the construction process of the self-learning parameter matching model includes:

performing implicit expression by using an artificial neural network model with the data of the construction parameters and the pile quality as samples; inputting the data into the constructed neural network for training; finding the nonlinear mapping relationship between the construction parameters of the jet grouting pile and the pile quality; storing the nonlinear mapping relationship in the connection weight of the input and output neurones; and with the construction parameters of the jet grouting pile as the input variables and the pile quality as the output variable, acquiring the optimal combination of the construction parameters by algorithm matching.

The optimal construction parameter database is jet grouting pile construction parameters, which can be obtained by the cloud platform under the typical stratum conditions. The database includes the slurry ratio, mud dosage, guniting pressure, grouting speed, drilling speed, lifting speed of the drill rod and rotating speed of the jet grouting pipe.

There are several advantages of the models. Firstly, the model has the characteristics of automatic learning. It does not need to establish an ideal model in advance. Learning is performed according to provided engineering construction data, and a mapping relationship between parameters is established adaptively. This model can overcome difficulties in nonlinear mathematical modeling in a traditional method.

Secondly, the optimal construction parameter database of the self-learning parameter matching system accumulates data of soil layer properties, construction parameters and the pile quality of existing jet grouting pile construction. The database supports update and optimization to ensure timeliness and applicability of built-in data. The soil layer type, the strength, the water content and the permeability coefficient identified in the previous step are input. The self-learning parameter matching system automatically matches the construction parameters of the jet grouting pile in the database. Based on the artificial neural network, the optimal construction parameters are output with the pile quality as a target.

In step S7, a construction parameter intelligent adjustment system is linked with the self-learning parameter matching system. When the soil layer type, the strength, the water content and the permeability coefficient change, the self-learning parameter matching system updates the optimal construction parameters in real time. According to the updated optimal parameter combination, the construction parameter intelligent adjustment system automatically adjusts the lifting speed, the rotating speed, and other construction parameters through the variable-frequency and variable-speed pressure adjusting device, so that the jet grouting pile adopts the optimal construction parameters in the whole construction process, and then the pile quality and efficiency are improved.

The variable-frequency and variable-speed pressure adjusting device includes the drilling driving motor and the high voltage variable frequency pump, where the drilling speed, the lifting speed of the drill rod and the rotating speed of the jet grouting pipe are controlled by the drilling driving motor; and the guniting pressure and the grouting speed are controlled by the high voltage variable frequency pump.

Embodiment II

The embodiment provides an intelligent construction control system for a jet grouting pile based on stratum information inversion, including: a construction process self-perception module, a stratum information real-time inversion module, a construction parameter self-matching module, and a piling machine intelligent control module.

The self-perception module in the construction process includes a drilling rig, multi-source sensing components, a wireless sensor network system and a data integration terminal. A stratum information real-time inversion system includes an XGBoost machine learning model and engineering stratum data training samples. A construction parameter self-matching system includes an optimal construction parameter database and a self-learning parameter matching system. A piling machine intelligent control system includes a variable-frequency and variable-speed pressure adjusting device and a construction parameter intelligent adjustment system.

The drilling rig is a high-pressure jet-grouting drilling rig, capable of monitoring drilling depth and output power of the drilling rig in real time. The multi-source sensing components are vibrating-wire sensors, including a torque sensor and a pore water pressure sensor which are mounted at a drill bit, and an axial force sensor mounted at a lower part of a drill rod. The drilling depth, torque, axial force, pore water pressure and the output power of the drilling rig in the drilling process are perceived in real time through the drilling rig and the multi-source sensing components; and the drilling depth, the torque, the axial force, the pore water pressure and the output power are used as input parameters for stratum inversion.

The wireless sensor network system includes a wireless transceiver chip, a low-power single-chip microcomputer, a line concentrator and a receiving terminal module, and is used for receiving sensor data and transmitting the sensor data to the data integration terminal.

Preferably, the single-chip microcomputer is an embedded ultra-low-power single-chip microcomputer, which has the advantages of high operation speed, strong stability and low consumption.

Preferably, the line concentrator is a stackable line concentrator, which regenerates and expands a received signal to expand a transmission interval of a network, and then quickly transmits port data to the terminal system.

The data integration terminal is used for receiving a sensor signal, displaying the sensor data, and inputting the data into a stratum information real-time inversion module.

The stratum information real-time inversion module is used for performing inversion with the XGBoost machine learning model in combination with data of a hole depth, the output power, the torque, the axial force and the pore water pressure of the drilling process, to obtain stratum inversion data;

the construction parameter self-matching module is used for obtaining an optimal construction parameter combination based on the optimal construction parameter database matching according to the stratum inversion data and a self-learning parameter matching model;

a construction parameter intelligent adjustment module is connected to the construction parameter self-matching system, to receive optimal construction parameters transmitted by the construction parameter self-matching system; and the construction parameters are controlled in real time by the variable-frequency and variable-speed pressure adjusting device to achieve intelligent control of the construction process and ensure that construction is performed according to the optimal construction parameters.

Specifically, it includes: linking the construction parameter intelligent adjustment module with the self-learning parameter matching model. When the stratum inversion data changes, the self-learning parameter matching model is updated in real time to obtain an updated optimal construction parameter combination, and the construction parameter intelligent adjustment module automatically adjusts the construction parameters by controlling the variable-frequency and variable-speed pressure adjusting device according to the updated optimal construction parameter combination. Hence, a whole construction process of the jet grouting pile is performed according to the optimal construction parameters.

Embodiment III

The embodiment provides a computer readable storage medium, in which a computer program is stored. When the program is executed by a processor, the steps of an intelligent construction control method for a jet grouting pile based on stratum information inversion in the embodiment I are implemented.

Embodiment IV

The embodiment provides a computer device, including a memory, a processor and a computer program stored in the memory and running on the processor. When the processor executes the program, the steps of an intelligent construction control method in the embodiment I are implemented.

Those skilled in the art should understand that the embodiments of the present invention may be provided as a method, a system, or a computer program product. Accordingly, the present invention may adopt a form of a hardware embodiment, a software embodiment or an embodiment combining software and hardware aspects. Moreover, the present invention may be used in the form of a computer program product implemented on one or more computer available storage media (including but not limited to a disk storage, an optical storage, etc.) having computer-usable program codes embodied in the media.

The present invention makes descriptions according to the method and the device (system) of the embodiments of the present invention and a flowchart and/or a block diagram of the computer program product. It should be understood that each flow and/or block in the flowchart and/or the block diagram as well as combination of the flows and/or the blocks in the flowchart and/or the block diagram may be implemented by instructions of the computer programs. These instructions of the computer programs may be provided to the processor of a general-purpose computer, a special-purpose computer, an embedded processor or other programmable data processing devices to produce a machine; and therefore, an apparatus for achieving specified functions in one or more flows in the flowchart or one or more blocks in the block diagram is produced through the instructions executed by the processor of the computer or other programmable data processing devices.

These instructions of the computer programs may further be stored in a computer readable memory which can guide the computer or the other programmable data processing devices to work in a specific mode; and therefore, a manufactured article including an instruction apparatus is produced by the instructions stored in the computer readable memory. The instruction apparatus achieves the specified functions in one or more flows in the flowchart or one or more blocks in the block diagram.

These instructions of the computer programs may further be loaded into the computer or other programmable data processing devices; and therefore, a series of operation steps are executed on the computer or other programmable devices to generate processing implemented by the computer, and then the instructions executed on the computer or other programmable devices provide the steps for achieving the specified functions in one or more flows in the flowchart or one or more blocks in the block diagram.

It will be appreciated by those of ordinary skilled in the art that all or a part of the flows of implementing the embodiment methods described above may be accomplished by computer programs instructing related hardware. The programs may be stored in one computer-readable storage medium, and may include the flows of the embodiments in the above method when the programs are executed. The storage medium may be a magnetic disk, an optical disk, a read-only memory (ROM), or a random access memory (RAM), etc.

What is described above is only preferred embodiments of the present invention and is not intended to limit the present invention, which may be modified and changed, for those skilled in the art. Any modification, equivalent replacement, improvement, etc. made within the spirit and principle of the present invention shall fall within the scope of protection of the present invention.

What is claimed is:

1. An intelligent construction control method for a jet grouting pile based on stratum information inversion, comprising the following steps:
    acquiring construction data in a drilling process;
    performing inversion in combination with the construction data of the drilling process and an XGBoost machine learning model to obtain stratum inversion data;
    obtaining an optimal construction parameter combination based on matching of an optimal construction parameter database according to the stratum inversion data and a self-learning parameter matching model; and
    linking a construction parameter intelligent adjustment module with the self-learning parameter matching model, wherein when the stratum inversion data changes, the self-learning parameter matching model is updated in real time to obtain an updated optimal construction parameter combination, and the construction parameter intelligent adjustment module automatically adjusts construction parameters by controlling a variable-frequency and variable-speed pressure adjusting device according to the updated optimal construction parameter combination, so that the whole construction process of the jet grouting pile is performed according to optimal construction parameters.

2. The intelligent construction control method for a jet grouting pile based on stratum information inversion according to claim 1, wherein the construction of the XGBoost machine learning model lies in that:
    by using engineering stratum data as a training sample for training, and drilling depth, torque, axial force, pore water pressure and output power as an input layer of the model; a correspondence relationship between perception information and stratum conditions is established; and by using the soil layer type, strength, a water content and a permeability coefficient as an output layer, a stratum is predicted, and the stratum information is inverted in real time.

3. The intelligent construction control method for a jet grouting pile based on stratum information inversion according to claim 1, wherein a construction process of the self-learning parameter matching model comprises:

implicitly expressing a mapping relationship by using an artificial neural network; with data of the construction parameters and pile quality as samples, inputting the data into a constructed neural network for training; finding a nonlinear mapping relationship between the construction parameters of the jet grouting pile and the pile quality and efficiency; storing the nonlinear mapping relationship in a connection weight of input and output neurones; and with the construction parameters of the jet grouting pile as input variables and the pile quality as an output variable, acquiring an optimal combination of the construction parameters by algorithm matching.

4. The intelligent construction control method for a jet grouting pile based on stratum information inversion according to claim 3, wherein in the self-learning parameter matching model, each neuron in the neural network receives input signals of other neurones connected to the neuron, and each input signal corresponds to a weight; a weighted sum of all the received signals determines an activation state of the neuron; these neurones have local memories, and can perform local operations; and each neuron has a single output connection which is capable of being branched into a plurality of parallel connections as needed to output a same signal, and the signal is not affected by the number of the parallel connections.

5. The intelligent construction control method for a jet grouting pile based on stratum information inversion according to claim 1, wherein the optimal construction parameter database is jet grouting pile construction parameters, comprising a slurry ratio, mud dosage, guniting pressure, grouting speed, drilling speed, lifting speed of a drill rod and rotating speed of a jet grouting pipe, obtained on the basis of a cloud platform under typical stratum conditions.

6. The intelligent construction control method for a jet grouting pile based on stratum information inversion according to claim 1, wherein the variable-frequency and variable-speed pressure adjusting device comprises a drilling driving motor and a high voltage variable frequency pump, drilling speed, lifting: speed of a drill rod and rotating speed of a jet grouting pipe are controlled by the drilling driving motor; and guniting pressure and grouting speed are controlled by the high voltage variable frequency pump.

7. The intelligent construction control method for a jet grouting pile based on stratum information inversion according to claim 1, wherein a method for acquiring the construction data in the drilling process comprises:

mounting a torque sensor and a pore water pressure sensor on a drill bit, and an axial force sensor at a lower part of a drill rod, and labeling the sensors;

moving a high-pressure jet-grouting drilling rig to a specified position, aligning the drill bit to a center of a hole, leveling the drilling rig and placing the drilling rig smoothly and horizontally; and performing drilling in the specified position, monitoring drilling depth and output power of the drilling rig in real time by using the high-pressure jet-grouting drilling rig, and perceiving torque, pore water pressure and axial force in the drilling process in real time by using the torque sensor, the pore water pressure sensor, and the axial force sensor.

8. A computer-readable storage medium, in which a computer program is stored, wherein when the program is executed by a processor, the steps of the intelligent construction control method for a jet grouting pile based on stratum information inversion according to claim 1 is implemented.

9. A computer device, comprising a memory, a processor and a computer program stored in the memory and running on the processor, wherein when the processor executes the program, the steps of the intelligent construction control method for a jet grouting pile based on stratum information inversion according to claim 1 is implemented.

10. An intelligent construction control system for a jet grouting pile based on stratum information inversion, comprising:

a construction process self-perception module, used for acquiring construction data in a drilling process;

a stratum information real-time inversion module, used for performing inversion in combination with the construction data of the drilling process and an XGBoost machine learning model to obtain stratum inversion data;

a construction parameter self-matching module, used for obtaining an optimal construction parameter combination based on matching of an optimal construction parameter database according to the stratum inversion data and a self-learning parameter matching model; and an intelligent control construction process, used for linking a construction parameter intelligent adjustment module with the self-learning parameter matching model, wherein when the stratum inversion data changes, the self-learning parameter matching model is updated in real time to obtain an updated optimal construction parameter combination, and the construction parameter intelligent adjustment module automatically adjusts construction parameters by controlling a variable-frequency and variable-speed pressure adjusting device according to the updated optimal construction parameter combination, so that a whole construction process of the jet grouting pile is performed according to the optimal construction parameters.

* * * * *